United States Patent
Ünsal et al.

(10) Patent No.: US 8,098,262 B2
(45) Date of Patent: Jan. 17, 2012

(54) ARBITRARY FRACTIONAL PIXEL MOVEMENT

(75) Inventors: Martin Ünsal, Santa Clara, CA (US); Aram Lindahl, Menlo Park, CA (US)

(73) Assignee: Apple Inc., Cupertino, CA (US)

(*) Notice: Subject to any disclaimer, the term of this patent is extended or adjusted under 35 U.S.C. 154(b) by 699 days.

(21) Appl. No.: 12/205,567

(22) Filed: Sep. 5, 2008

(65) Prior Publication Data
US 2010/0060646 A1    Mar. 11, 2010

(51) Int. Cl.
G06T 15/70 (2006.01)
G09G 5/00 (2006.01)
G06K 9/00 (2006.01)
G06K 9/40 (2006.01)

(52) U.S. Cl. ........ 345/613; 345/581; 345/606; 345/643; 345/473; 348/552; 382/162; 382/274; 382/300; 382/303

(58) Field of Classification Search .......... 345/418, 345/428, 581, 586, 589, 606, 616–618, 640–643, 345/473, 502, 501, 506; 348/254, 552, 553, 348/671; 382/162, 167, 274, 276, 299–300, 382/303, 305
See application file for complete search history.

(56) References Cited

U.S. PATENT DOCUMENTS

| | | | |
|---|---|---|---|
| 5,261,041 A | 11/1993 | Susman | |
| 5,544,295 A | 8/1996 | Capps | |
| 5,596,687 A * | 1/1997 | Peters, Jr. | 345/582 |
| 5,596,694 A | 1/1997 | Capps | |
| 5,680,531 A | 10/1997 | Litwinowicz et al. | |
| 5,878,396 A | 3/1999 | Henton | |
| 6,285,804 B1 * | 9/2001 | Crinon et al. | 382/299 |
| 2002/0047658 A1 * | 4/2002 | Nakanishi et al. | 315/364 |
| 2003/0193527 A1 * | 10/2003 | Pharr | 345/853 |
| 2003/0223628 A1 * | 12/2003 | Meyer | 382/128 |
| 2004/0257432 A1 | 12/2004 | Girish et al. | |
| 2006/0153040 A1 | 7/2006 | Girish et al. | |
| 2007/0083467 A1 | 4/2007 | Lindahl et al. | |
| 2007/0157268 A1 | 7/2007 | Girish et al. | |
| 2008/0317111 A1 * | 12/2008 | Davis | 375/227 |
| 2010/0007665 A1 * | 1/2010 | Smith et al. | 345/473 |

OTHER PUBLICATIONS

Avkarogullari, Gokhan et al.; "Image Animation with Transitional Images"; U.S. Appl. No. 11/899,144, filed Sep. 4, 2007.

* cited by examiner

*Primary Examiner* — Wesner Sajous
(74) *Attorney, Agent, or Firm* — Fletcher Yoder PC

(57) ABSTRACT

A technique is provided for displaying pixels of an image at arbitrary subpixel positions. In accordance with aspects of this technique, interpolated intensity values for the pixels of the image are derived based on the arbitrary subpixel location and an intensity distribution or profile. Reference to the intensity distribution provides appropriate multipliers for the source image. Based on these multipliers, the image may be rendered at respective physical pixel locations such that the pixel intensities are summed with each rendering, resulting in a destination image having suitable interpolated pixel intensities for the arbitrary subpixel position.

21 Claims, 3 Drawing Sheets

ARBITRARY FRACTIONAL PIXEL MOVEMENT

BACKGROUND OF THE INVENTION

1. Field of the Invention

The present invention relates generally to image processing, and more particularly to the animation of images.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Electronic devices, including computers and portable devices such as phones and media players, typically include display screens as part of the user interface of the device. Such display screens may be useful for displaying text or images to a user of the device. In some instances it may be desirable, for aesthetics or other reasons, to animate one or more of the images being displayed. For example, a logo or piece of artwork may be animated to move on the display when the device is being used, such as while a song is being played, or when the device is not being used, such as to perform a screen saver type function.

Animation of images, however, may appear blocky or crudely rendered in some circumstances. For example, when the desired motion is very slow, such as less than one pixel of motion per animation frame, the perceived motion may be visibly jerky, an effect known as temporal aliasing. This perceptible jerkiness may not be aesthetically pleasing to the viewer. In other words, such slow animation sequences may not provide the smooth, seamless animation that is desired.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

There is provided a technique for displaying pixels of an image at arbitrary subpixel positions. In accordance with aspects of this technique, an image can be animated to appear to be at arbitrary subpixel locations, thereby allowing the apparent continuous motion of the image in a smooth manner, even at slow animation speeds (such as less than one pixel per frame). In one embodiment, a convolution kernel is employed which takes into account nearby pixels in either one or two-dimensions. Parameters for the convolution kernel may be derived using one or more intensity profiles situated with respect to the desired arbitrary subpixel destination. Based on the convolution kernel and derived parameters, the image may be rendered at the destination pixels such that the grayscale or color intensity is interpolated to create the perception that the image has been animated to the subpixel location. In one implementation, the rendering is accomplished using two-dimensional graphics circuitry that allows an entire image to be rendered based on the convolution kernel. Such circuitry may be configurable to allow multiple intensities, i.e., multiple rendering operations, to be accumulated at a pixel.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
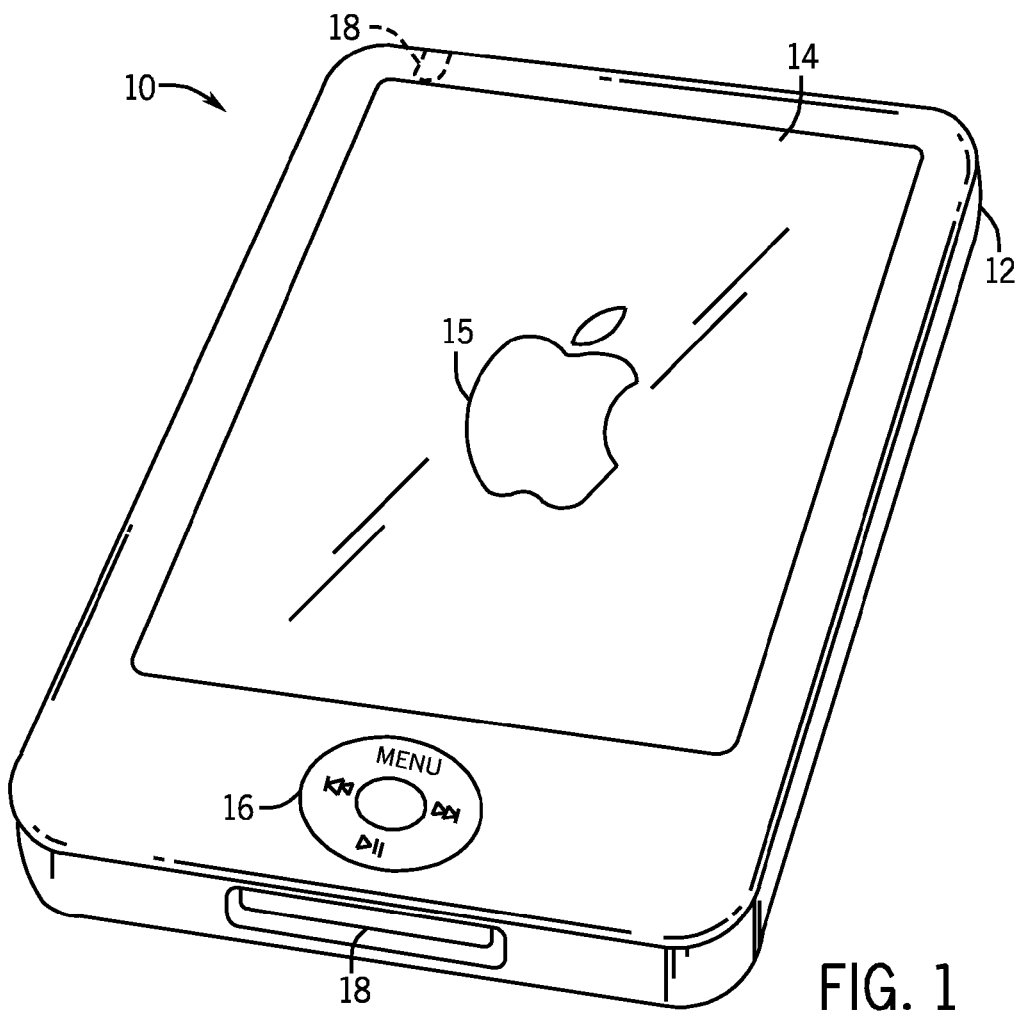
FIG. 1 is a view of an exemplary portable electronic device having a display, in accordance with aspects of the present technique.

Turning now to the figures, FIG. 1 depicts an electronic device 10 in accordance with one embodiment of the present invention. In one embodiment, the electronic device may be a processor-based system, such as a computer or handheld entertainment or communication device, which displays text and/or images via a separate or integral display. For example, in some embodiments, the electronic device 10 may be a media player for playing music and/or video, a cellular phone, a personal data organizer, or any combination thereof. Thus, the electronic device 10 may be a unified device providing any one of or a combination of the functionality of a media player, a cellular phone, a personal data organizer, and so forth. In addition, the electronic device 10 may allow a user to connect to and communicate through the Internet or through other networks, such as local or wide area networks. For example, the electronic device 10 may allow a user to communicate using e-mail, text messaging, instant messaging, or using other forms of electronic communication. By way of example, the electronic device 10 may be a model of an iPod® having a display screen or an iPhone® available from Apple Inc.

In certain embodiments the electronic device 10 may be powered by a rechargeable or replaceable battery. Such battery-powered implementations may be highly portable, allowing a user to carry the electronic device 10 while traveling, working, exercising, and so forth. In this manner, a user of the electronic device 10, depending on the functionalities provided by the electronic device 10, may listen to music, play games or video, record video or take pictures, place and take telephone calls, communicate with others, control other devices (e.g., the device 10 may include remote control and/or Bluetooth functionality, for example), and so forth while moving freely with the device 10. In addition, in certain embodiments the device 10 may be sized such that it fits relatively easily into a pocket or hand of the user. In such embodiments, the device 10 is relatively small and easily handled and utilized by its user and thus may be taken practically anywhere the user travels. While the present discussion and examples described herein generally reference an electronic device 10 which is portable, such as that depicted in FIG. 1, it should be understood that the techniques discussed herein may be applicable to any electronic device having a display, regardless of the portability of the device.

In the depicted embodiment, the electronic device 10 includes an enclosure 12, a display 14, user input structures 16, and input/output connectors 18. The enclosure 12 may be formed from plastic, metal, composite materials, or other suitable materials or any combination thereof. The enclosure 12 may protect the interior components of the electronic device 10 from physical damage, and may also shield the interior components from electromagnetic interference (EMI).

The display 14 may be a liquid crystal display (LCD) or may be a light emitting diode (LED) based display, an organic light emitting diode (OLED) based display, or other suitable display. In accordance with certain embodiments of the present technique, the display 14 may display a user interface as well as various images 15, such as logos, avatars, photos, album art, and so forth. Additionally, in one embodiment the display 14 may be a touch screen through which a user may interact with the user interface. The display 14 may also display various function and/or system indicators to provide feedback to a user, such as power status, call status, memory status, etc. These indicators may be in incorporated into the user interface displayed on the display 14.

In one embodiment, one or more of the user input structures 16 are configured to control the device 10, such as by controlling a mode of operation, an output level, an output type, etc. For instance, the user input structures 16 may include a button to turn the device 10 on or off. In general, embodiments of the electronic device 10 may include any number of user input structures 16, including buttons, switches, a control pad, keys, knobs, a scroll wheel, or any other suitable input structures. The input structures 16 may work with a user interface displayed on the device 10 to control functions of the device 10 or of other devices connected to or used by the device 10. For example, the user input structures 16 may allow a user to navigate a displayed user interface or to return such a displayed user interface to a default or home screen.

The electronic device 10 may also include various input and output ports 18 to allow connection of additional devices. For example, a port 18 may be an audio jack that provides for connection of headphones or portable speakers. Additionally, a port 18 may have both input/output capabilities to provide for connection of a headset (e.g. a headphone and microphone combination). Embodiments of the present invention may include any number of input and/or output ports, including headphone and headset jacks, universal serial bus (USB) ports, Firewire or IEEE-1394 ports, and AC and/or DC power connectors. Further, the device 10 may use the input and output ports to connect to and send or receive data with any other device, such as other portable electronic devices, personal computers, printers, etc. For example, in one embodiment the electronic device 10 may connect to a personal computer via a USB, Firewire, or IEEE-1394 connection to send and receive data files, such as media files.

Figure 2:
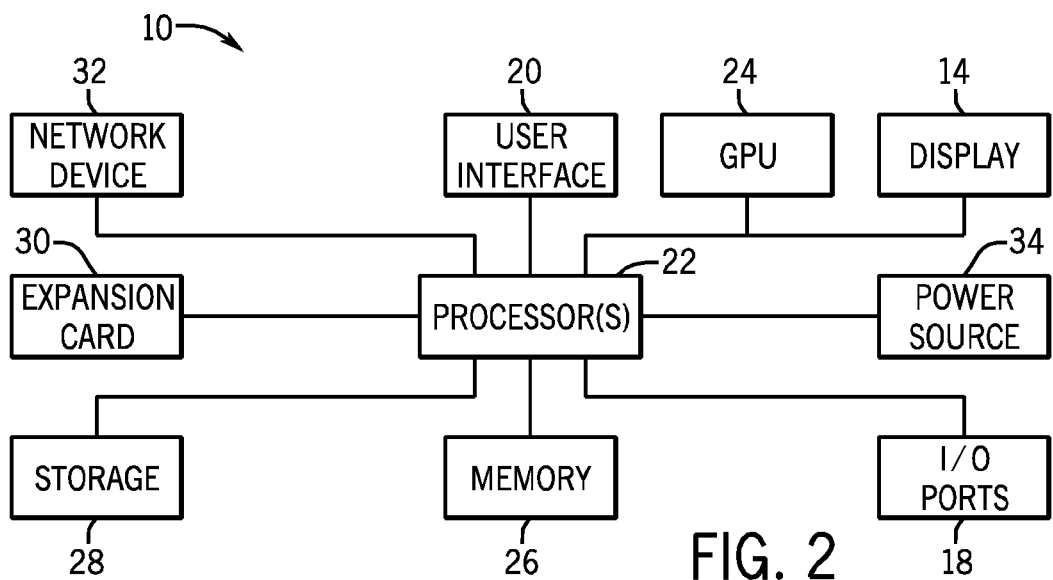
FIG. 2 is a block diagram of exemplary components of the portable electronic device of FIG. 1, in accordance with aspects of the present technique.

Turning now to FIG. 2, a block diagram of components of an illustrative electronic device 10 is shown. The block diagram includes the display 14, input structure(s) 16 and I/O ports 18 discussed above. In addition, the block diagram illustrates one or more processors 22, a graphics processing unit (GPU) 24, a memory 26, storage 28, card interface(s) 30, networking device 32, and power source 34.

In certain embodiments an input structure 16 and display 14 may be provided together, such an in the case of a touchscreen where a touch sensitive mechanism is provided in conjunction with the display 14. In such embodiments, the user may select or interact with displayed interface elements via the touch sensitive mechanism. In this way, the displayed user interface may provide interactive functionality, allowing a user to select, by touch screen or other input structure, from among options displayed on the display 14.

The processor(s) 22 may provide the processing capability required to execute the operating system, programs, user interface, and any other functions of the device 10. The processor(s) 22 may include one or more microprocessors, such as one or more "general-purpose" microprocessors, a combination of general and special purpose microprocessors, and/or ASICS. For example, the processor(s) 22 may include one or more reduced instruction set (RISC) processors, video processors, and/or related chip sets. In addition, the electronic device 10 of FIG. 2 is depicted as including a separate GPU 24. Such a GPU 24 may, among other functions, render frame buffers stored in the memory 26 and/or generate one or more graphics layers which constitute the display interface rendered on the display 14. In addition, in certain embodiments, the GPU 24 (or CPU 22 in other embodiments) may be configured to implement certain rendering functions, as described herein, related to the use of convolution kernels, such as may be used in subpixel interpolation or other convolution functions.

Embodiments of the electronic device 10 may also include a memory 26. The memory 26 may include a volatile memory, such as RAM, and a non-volatile memory, such as ROM. The memory 26 may store a variety of information and may be used for a variety of purposes. For example, the memory 26 may store the firmware for the device 10, such as an operating system for the device 10 and/or any other programs or executable code necessary for the device 10 to function. In addition, the memory 26 may be used for buffering or caching during operation of the device 10.

The device 10 in FIG. 2 may also include non-volatile storage 28, such as ROM, flash memory, a hard drive, any other suitable optical, magnetic, or solid-state storage medium, or a combination thereof. The storage 28 may store data files such as media (e.g., music and video files), software (e.g., for implementing functions on device 10), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable a media device to establish a wireless connection such as a telephone connection), subscription information (e.g., information that maintains a record of podcasts or television shows or other media to which a user subscribes), telephone information (e.g., telephone numbers), and any other suitable data.

The embodiment in FIG. 2 also includes one or more card slots 30. The card slots 30 may receive expansion cards that may be used to add functionality to the device 10, such as additional memory, I/O functionality, or networking capability. The expansion card may connect to the device 10 through any type of connector and may be accessed internally or externally to the enclosure 12. For example, in one embodiment the card may be a flash memory card, such as a SecureDigital (SD) card, mini- or microSD, CompactFlash card, Multimedia card (MMC), etc. Additionally, in some embodiments a card slot 30 may receive a Subscriber Identity Module (SIM) card, for use with an embodiment of the electronic device 10 that provides mobile phone capability.

The device 10 depicted in FIG. 2 may also include a network device 32, such as a network controller or a network interface card (NIC). In one embodiment, the network device 32 may be a wireless NIC providing wireless connectivity over any 802.11 standard or any other suitable wireless networking standard. The network device 32 may allow the device 10 to communicate over a network, such as a LAN, WAN, MAN, or the Internet. Further, the device 10 may connect to and send or receive data with any device on the network, such as other portable electronic devices, personal computers, printers, etc. For example, in one embodiment, the electronic device 10 may connect to a personal computer via the network device 32 to send and receive data files, such as media files. Alternatively, in some embodiments the electronic device may not include a network device 32. In such an embodiment, a NIC may be added into card slot 30 to provide similar networking capability as described above.

The device 10 may also include or be connected to a power source 34. In one embodiment, the power source 34 may be a battery, such as a Li-Ion battery. In such embodiments, the battery may be rechargeable, removable, and/or attached to other components of the device 10. Additionally, in certain embodiments the power source 34 may be an external power source, such as a connection to AC power and the device 10 may be connected to the power source 34 via the I/O ports 18.

As will be appreciated, the electronic device 10 described above may take a variety of forms and may perform a variety of functions. In performing those functions, the display 14 of the device 10 may be used to display various images 15. For example, the display 14 may be used to display images at the request of the user or for aesthetic appeal when a function is being performed that is not otherwise utilizing the display 14, such as the playing of audio files. Further, the various aspects and screens of the user interface may also be considered to be images that are displayed when appropriate based on the state of the device 10.

In some instances, it may be desirable to animate the images 15 being displayed on the device 10. For example, it may be desirable to animate an image to move slowly across the display 14, such as in a one-dimensional or two-dimensional manner. Likewise, to the extent that the user interface may display images, such as screens of the interface, it may be desirable to animate transitions between screens of the user interface, thereby creating the illusion of physical movement and transition.

Such animation may involve a sequence of incremental steps whereby the image being animated appears to be moved on the display 14. In particular, such an appearance of movement is typically achieved by redrawing the image 15 at different locations on the display 14 in the direction of apparent movement. In effect, the intensity or color values of the pixels that compose the image 15 are shifted or redrawn in other pixels in the direction of motion, effectively displacing the image 15 in an incremental fashion.

In some instances, where the desired motion is very slow (such as less than one pixel per frame) the perceived motion may appear jerky and abrupt. To address this jerkiness, it may be desirable to create the perception that the image 15, and thus the pixels comprising the image 15, are moving in increments smaller than one pixel at a time, i.e., in subpixel increments. As will be appreciated, however, the pixels forming the display are discrete, physical entities, and are not subject to physical division or partial operation in this manner. Instead, to achieve this apparent subpixel motion, it may be desirable to redraw the image 15, and its constituent pixels, using intermediate intensity or color values to create the perceived subpixel motion.

For example, consider a pixel of an image 15 being moved over 60 frames from position (23,30) on a display 14 to position (26,30) over a one second interval (that is, the pixel is being moved three pixels to the right in one second). Without subpixel interpolation, the pixel would be displayed for 15 frames at (23,30), for 15 frames at (24, 30), for 15 frames at (25,30), and for 15 frames at (26,30). Such an approach results in 4 visible jumps in position per second (that is, it appears that the animation is occurring at 4 frames per second) even though the animation is actually occurring at 60 frames per second. As a result, the perceived pixel transitions are jerky and abrupt despite the high frame rate. A smoother animation sequence could be achieved if the pixel being moved could appear to move in sequence from location (23, 30) to (23.066,30) to (23.133, 30) to (23.2,30) and so forth to eventually reach location (26,30) after one second of animation. That is, the animation would appear smoother if there appeared to be 58 subpixel locations between locations (23, 30) and (26,30) which could each be traversed over the one second interval. Thus smooth animation may benefit from being able to display the pixels of an image 15 at arbitrary subpixel positions based on the distance to be traveled by the pixels and the time allotted the animation sequence.

As described herein, the present disclosure provides a technique utilizing conventional pixel-based computer graphics (which define color intensities on an integer coordinate grid) to provide the appearance of image pixels positioned at arbitrary subpixel positions (i.e., at integer and/or non-integer coordinates). In this manner, the present technique permits smooth animation of images for distances smaller than one pixel.

By way of illustration, the following examples are provided. In the first example, a pixel of an image 15 is described as being animated to move in one frame along a single dimension to an arbitrary subpixel location. In this example, the pixel is described as being "moved" from coordinate (38, 94) to (38.24,94), i.e., along the x-axis by 0.24 of a pixel. A depiction of a pixel grid illustrating such a move is provided as FIG. 3. In this example, parameters for a one-dimensional convolution kernel are selected so that the convolution of the kernel in the X-direction gives the appearance of a subpixel location on the X-axis. Different convolution parameters are determined for different subpixel locations. For example, the same convolution parameters may be used to display a pixel at (40.24,94) as to display the pixel at (38.24,94), however different convolution parameters are required to display the image at (38.57,94).

Figure 3:
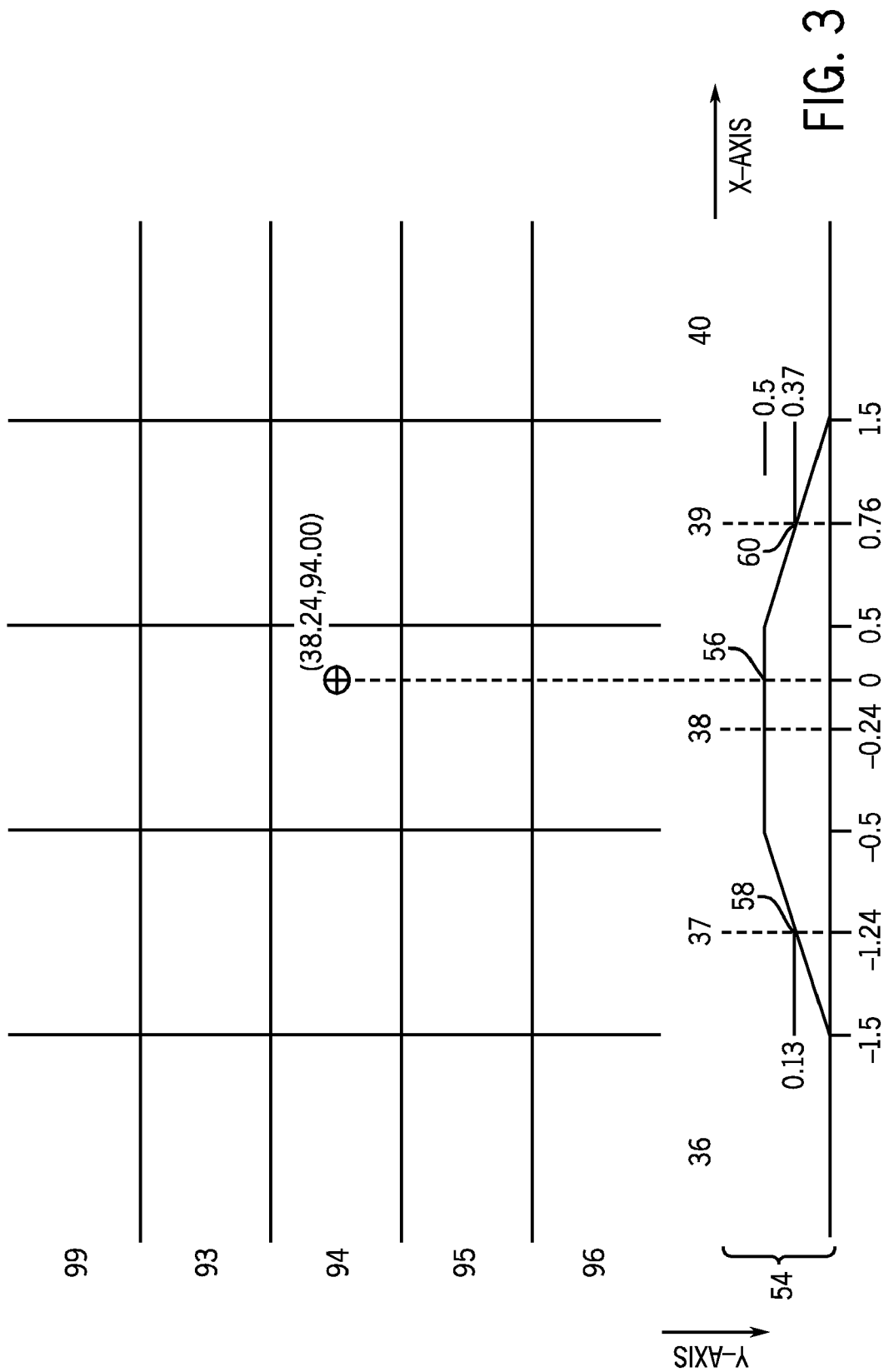
FIG. 3 depicts a pixel grid and intensity profile associated with one-dimensional subpixel animation, in accordance with aspects of the present technique.

With this in mind and turning to FIG. 3, the pixel value at coordinate (38,94), is interpolated to appear to be displayed at (38.24,94). In the depicted example, a convolution three pixels wide is employed, resulting in three multiply accumulate operations per pixel. That is, the three pixels generally centered around the (38.24,94) position on the X-axis (i.e., (37, 94), (38,24), and (39,24) form the basis for the convolution. In other implementations, however, different widths of convolution kernel, such as five or seven pixel wide kernels, may be employed.

In the present example, an intensity profile 54 generally representing a distribution of the intensities of the three pixels is provided as a reference. In this example, the intensity distribution provides for half intensity (i.e., 0.5) in a pixel-wide span centered on the arbitrary X-axis location, while to either side of this pixel-wide span, the intensity decrease linearly to 0 over respective pixel-wide spans. That is, over a three-pixel wide span, the intensity rises from 0 to 0.5 in a single pixel span, remains at 0.5 for a single pixel span, and fall from 0.5 to 0 in the remaining pixel span. While this example illustrates the intensities as rising and falling linearly, in other embodiments, the distribution maybe more complex and/or arbitrary. In such embodiments, the distribution may include curved or arcuate segments or any suitable curvilinear segment.

The intensity profile 54 is centered about the arbitrary position (here 38.24 on the X-axis) which is the target destination. When centered in this manner, the intercept 56 between the arbitrary X-axis location (38.24) and the intensity profile is 0.5. Likewise, the intercepts 58 and 60 respectively one pixel to the left and right of the target destination intersect the intensity profile at 0.31 and 0.37 respectively.

These intercept values sum to 1, i.e., 100% of the intensity value of the source pixel, and represent the respective multipliers used to spread the source pixel intensity within the three-pixel span. Thus, to represent a subpixel at coordinate (38.24,94), the source pixel being animated would be rendered (blitted) three times in the above example. In particular, the source pixel would be rendered at coordinate (37,94) with a multiplier of 0.13, at coordinate (38,94) with a multiplier of 0.5, and at coordinate (39,94) with a multiplier of 0.37. That is, each multiplier would be multiplied with the respective intensity of the pixel being animated to derive intensity values at the three respective pixels being convolved. Thus, the intensity associated with the pixel being animated to appear at arbitrary pixel location (38.24,94) would be spread out over the nearest three pixels along the X-axis.

As other pixels likely comprise the image 15, each of these pixels will likely be undergoing corresponding subpixel animation. Thus, the derived multipliers that are derived for one illustrative pixel of the image may be used to animate the entire image, such by redrawing the entire image at each of the respective three pixel offsets with the corresponding multiplier for each pixel. That is, the image 15 may be redrawn at (x−1, y) with the corresponding multiplier (0.13 in this example). Likewise, the image 15 may be redrawn at (x,y) with the multiplier 0.5 and at (x+1,y) with the multiplier 0.37 with the intensities being summed at each pixel to produce the final destination image.

Further, for an entire image undergoing animation, the intensity at each physical, i.e., integer, pixel position may actually be the sum of different partial pixel intensities generated by respective convolution processes associated with nearby pixels. For example, the physical pixel (38,94) may have an intensity that is the sum of the partial pixel intensities associated with arbitrary pixel locations (37.24, 94), (38.24, 94), and (39.24,94) if all of these pixels are associated with the image 15 and are moved by the same arbitrary amount along the X-axis.

Further, the above example is presented simply in terms of an intensity associated with each pixel, which may be appropriate for grayscale displays. Color embodiments are handled the same as grayscale embodiments except that each color channel is separately, but identically processed. That is, each color channel, (such as red, green, and/or blue color channels) may be processed using the same convolution parameters and the same multiply accumulate operations. Thus, in such an embodiment, the processing of the different color channels will only differ to the extent that the source or input color channel intensities differ, since the convolution parameters and multiply accumulate operations will otherwise be the same for each color channel.

Figure 4:
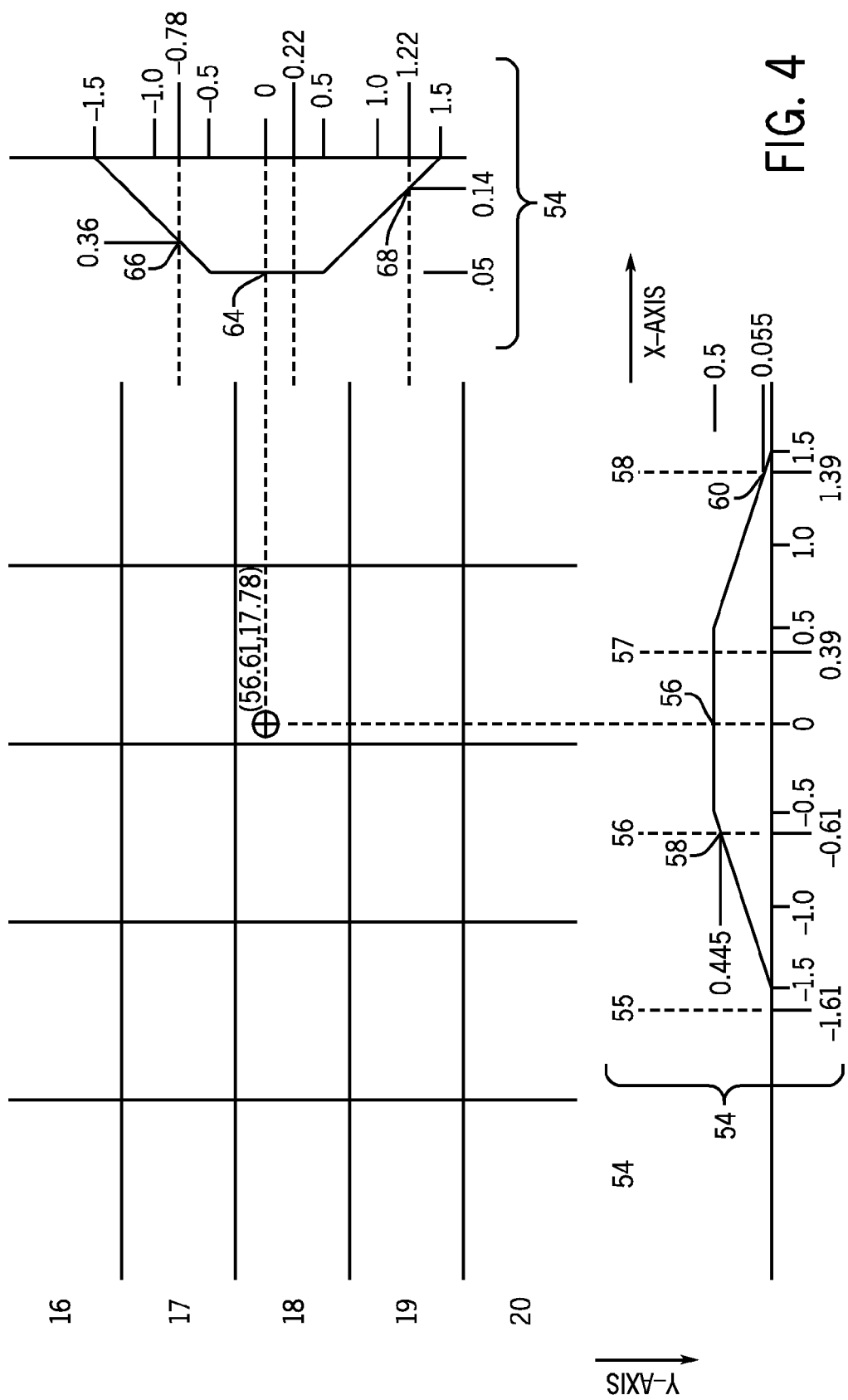
FIG. 4 depicts a pixel grid and intensity profiles associated with two-dimensional subpixel animation, in accordance with aspects of the present technique.

Turning now to FIG. 4, a similar two-dimensional example of arbitrary subpixel animation is provided. In this example, a pixel is to be interpolated to appear to be displayed at arbitrary subpixel location (56.61,17.78) as one step in animating the image along an arbitrary path. In this example, parameters are selected for a two-dimensional convolution kernel to give the appearance of an unconstrained pixel location. As noted above, different convolution parameters are employed for different subpixel locations. In the depicted example, a 3×3 convolution kernel is described, which results in 9 multiply accumulate operations per pixel. In other embodiments, different sizes of convolution kernel, such as 5×5 or 7×7, may be employed.

In the present example, intensity profiles 54 generally corresponding to the intensities along the X- and Y-axes are provided as references. As previously noted, the distributions, though depicted with linear rises and falls may be other shapes and/or may cover a different span of pixels. For example, one or both distributions may employ curved, arcuate, or otherwise curvilinear segments such that the distributions 54 may take a variety of forms.

The intensity profile 54 associated with the X-axis is centered about the arbitrary X-axis position (here 56.61) which is the target destination along the X-axis. When centered in this manner, the intercept 56 between the arbitrary X-axis location (56.61) and the intensity profile is 0.5. Likewise, the intercepts 58 and 60 respectively one pixel to the left and right of the target destination intersect the intensity profile at 0.445 and 0.055 respectively. These three intercept values sum to 1 and are used in the determination of the multipliers of the multiply accumulate operations described above to arrive at the interpolated intensity value.

Similarly, the intensity profile 54 associated with the Y-axis is centered about the arbitrary Y-axis position (here 17.78) which is the target destination along the Y-axis. When centered in this manner, the intercept 64 between the arbitrary Y-axis location (17.78) and the intensity profile is 0.5. Likewise, the intercepts 66 and 68 respectively one pixel to the above and below the target destination intersect the intensity profile at 0.36 and 0.14 respectively. These three intercept values also sum to 1 and are used to derive the multipliers of the multiply accumulate operations described above to arrive at the interpolated intensity value.

To represent a subpixel at coordinate (56.61,17.78), the pixel being animated would be rendered (blitted) nine times. In particular, the pixel would be rendered at each of the nine coordinates with respective multipliers derived as the product of the respective coordinate intercepts, as noted above and as set forth in Table 1.

TABLE 1

| Coordinate | Intersects | Multiplier |
| --- | --- | --- |
| (56, 17) | (0.445) (0.36) | 0.1602 |
| (57, 17) | (0.5) (0.36) | 0.18 |
| (58, 17) | (0.055) (0.36) | 0.0198 |

TABLE 1-continued

| Coordinate | Intersects | Multiplier |
|---|---|---|
| (56, 18) | (0.445) (0.5) | 0.2225 |
| (57, 18) | (0.5) (0.5) | 0.25 |
| (58, 18) | (0.055) (0.5) | 0.0275 |
| (56, 19) | (0.445) (0.14) | 0.0623 |
| (57, 19) | (0.5) (0.14) | 0.07 |
| (58, 19) | (0.055) (0.14) | 0.0077 |

Thus, the intensity associated with the pixel being animated to appear at arbitrary pixel location (56.61,17.78) would be spread out over a nine pixel array, i.e., a 3×3 array.

As noted in the previous example, to the extent that an entire image 15 is being animated, other surrounding pixels are likely also undergoing corresponding subpixel animation. Thus, the derived multipliers that are derived for one illustrative pixel of the image may be used to animate the entire image, such by redrawing the entire image at each of the respective nine pixel offsets with the corresponding multiplier for each pixel. That is, the image 15 may be redrawn at (x−1, y−1) with the corresponding multiplier (0.1602 in this example) applied to the intensity of each pixel. Likewise, the image 15 may be redrawn at each of the other eight positions with the corresponding intensity multiplier and the intensities being summed at each pixel to produce the final destination image.

Further, in such an image animation the physical, i.e., integer, pixels, may have a display intensity corresponding to the sum of numerous surrounding subpixel interpolation implementations. Likewise, as previously explained, the described single intensity operation may be appropriate for a grayscale implementation or for color implementations, with each color channel being separately but identically processed. For example, in a color implementation, each color channel (such as red, green, and/or blue color channels) may be processed using the same convolution parameters and the same multiply accumulate operations. In such an implementation, the processing of different color channels will only differ to the extent that the source or input color channel intensities differ, since the convolution parameters and multiply accumulate operations will otherwise be the same for each color channel.

The preceding discussion relates the mathematical aspects of arbitrary subpixel interpolation. In one embodiment such an interpolation process may be implemented using general purpose circuit or an application-specific integrated circuit (ASIC) used in image rendering. For example, two-dimensional rendering circuitry, such as may be implemented as part of a GPU 24 used in portable electronic devices, may be configured to perform a multiply accumulate operation on an entire image 15, as opposed to a pixel-by-pixel operation. In one such example, a graphics ASIC or and/or GPU 24 may be employed that allows for configuration or reconfiguration of functions typically employed to account for opacity and translucency when rendering an image. That is the function:

$$D = (\alpha)(S) + (1-\alpha)(D) \quad (1)$$

where D is the destination pixel intensity (or intensity at a given color channel), S is the source pixel intensity, α is opacity (or, more generally, an intensity coefficient), and (1−α) is translucency may be reconfigured to function as:

$$D = (\alpha)(S) + (1)(D) \quad (2)$$

where there is no translucency associated with the destination pixel. In this manner, the destination pixel intensity is not occluded by the opacity of the source pixel. In such an embodiment, the desired multiply-accumulate functionality may be provided since the source and destination pixel intensities are added to one another. Thus, an entire image may be rendered multiple times at adjacent pixels with a different multiplier applied with each rendering operation so that the effects are additive and the final image corresponds to the sum of the various rendering operations. Further, while the described implementation has been presented in the context of subpixel interpolation, it may be useful in other types of operations which utilize a convolution kernel, such as motion blurring effects (or image blurring in general), edge enhancement, and so forth. In addition, as will be appreciated, the desired rendering operation may instead be performed by software or firmware executing on a GPU or CPU or by some combination of dedicated circuitry and software.

Using such circuitry and/or software, a one-dimensional convolution, such as described in the first example above, may be implemented in three rendering operations. That is, an entire image 15 may be "moved" to an arbitrary subpixel location in three rendering operations, i.e., by rendering the image at an offset of (x−1, y), (x,y), and (x+1,y) (or at similar offsets along the Y-axis) with appropriate intensity multipliers for each rendering. Similarly, a two-dimensional convolution, such as described in the second example above, may be implemented in nine rendering operations to move an entire image to an arbitrary subpixel location. In such implementations, no bilinear filtering is employed to render images with subpixel accuracy.

This example may be generalized as a generic blending equation for blending a source image into a destination. For example, for the one-dimensional convolution described above, the operation may be generically represented as $$D_{(x,y)} = 0 + (\alpha_1)(S_{(x-1,y)}) + (\alpha_2)(S_{(x,y)}) + (\alpha_3)(S_{(x+1,y)}) \quad (3)$$

at a given pixel, where 0 represents the act of setting initial pixel value to 0 (i.e., blanking or blacking out the respective pixels) prior to performing the multiply-accumulate operation and where α corresponds to the derived multipliers (such as 0.13, 0.5, 0.37 discussed above) with respect to X-axis animation. Similarly, a two-dimensional convolution based on a 3×3 matrix may be generically represented as:

$$D_{(x,y)} = 0 + (\alpha_1)(\beta_1)(S_{(x-1,y-1)}) + (\alpha_1)(\beta_2)(S_{(x-1,y)}) + \quad (4)$$
$$(\alpha_1)(\beta_3)(S_{(x-1,y+1)}) + (\alpha_2)(\beta_1)(S_{(x,y-1)}) + (\alpha_2)(\beta_2)(S_{(x,y)}) +$$
$$(\alpha_2)(\beta_3)(S_{(x,y+1)}) + (\alpha_3)(\beta_1)(S_{(x+1,y-1)}) +$$
$$(\alpha_3)(\beta_2)(S_{(x+1,y)}) + (\alpha_3)(\beta_3)(S_{(x+1,y+1)})$$

where β corresponds to the derived multipliers discussed above with respect to Y-axis animation.

While the preceding example is described in the context of using two-dimensional rendering circuitry or operations, in other embodiments, circuitry or a GPU configured for three-dimensional display may also be used. For example, the described operations could be performed using three-dimensional hardware with an accumulation buffer. In such an embodiment, multiple passes may be performed to avoid issues related to bilinear filtering, which is typically employed in a three-dimensional pipeline.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A processor-implemented method for animating an image, comprising:
    using a processor of an electronic device, determining a plurality of multipliers for an image at an initial location using one or more distributions, wherein each distribution is centered on a non-integer pixel location with respect to a display of the electronic device; and
    using the processor of the electronic device, rendering, on the display of the electronic device, the image at the initial location and at proximate locations such that overlapping pixels of the rendered images have a cumulative intensity, wherein each rendering of the image is reduced in intensity by a respective multiplier of the plurality of multipliers.

2. The processor-implemented method of claim 1, comprising wherein the plurality of multipliers represent locations on a single distribution or the product of locations on two different distributions.

3. The processor-implemented method of claim 1, wherein the one or more distributions span three, five, or seven pixels.

4. The processor-implemented method of claim 1, comprising setting the pixel intensity values to 0 prior to rendering the image.

5. The processor-implemented method of claim 1, wherein the cumulative intensity corresponds to a grayscale intensity or an intensity at one or more color channels.

6. One or more non-transitory recording media, comprising computer-executable code configured to:
    set pixel values to zero within a region of a display;
    derive a plurality of intensity coefficients for an image based on a non-integer pixel position within the region;
    render an image at multiple proximate positions to the non-integer pixel position in an additive manner, wherein each rendering of the image is performed using a respective one of the plurality of intensity coefficients.

7. The one or more non-transitory recording media of claim 6, wherein the computer-executable code configured to derive the plurality of intensity coefficients utilizes one or more intensity distributions describing pixel intensity as a function of the non-integer pixel position.

8. The one or more non-transitory recording media of claim 6, wherein the computer-executable code configured to render achieves an additive effect by assigning opacity to a source image being rendered while not assigning translucency to a destination image such that the intensities of the source and destination images are added at each pixel.

9. The one or more non-transitory recording media of claim 6, wherein the multiple proximate positions correspond to an initial pixel location and adjacent pixels in one or two-dimensions.

10. The one or more non-transitory recording media of claim 6, wherein the non-transitory media comprises a memory, a storage, or a expansion card of an electronic device.

11. An electronic device, comprising:
    a display;
    a storage device physically encoding routines for deriving intensity coefficients for arbitrary pixel locations and for animating an image using the derived intensity coefficients; and
    one or more processors or graphics processing units (GPUs) configured to execute the routines stored in the storage device.

12. The electronic device of claim 11, wherein the electronic device comprises one of a media player, a cellular phone, or a personal data organizer.

13. The electronic device of claim 11, wherein the electronic device comprises a portable electronic device.

14. The electronic device of claim 11, wherein the routine for deriving intensity coefficients utilizes one or more intensity distributions, wherein each intensity distribution is centered on the arbitrary pixel location in at least one dimension.

15. The electronic device of claim 11, wherein the routine for animating the image renders the image at multiple locations adjacent to the arbitrary pixel location in an additive manner.

16. The electronic device of claim 11, wherein the storage device further physically encodes a routine for setting the intensity of one or more pixels where the image will be animated to zero.

17. A processor-implemented animation, comprising:
    one or more animation steps implemented by a processor of an electronic device and displayed on a display of the electronic device, wherein the one or more animation steps are each perceived to occur at arbitrary subpixel locations, wherein each animation step that is perceived to occur at an arbitrary subpixel location comprises a plurality of proximate and additive renderings of an image, each rendering being modified by a respective intensity coefficient.

18. The processor-implemented animation of claim 17, wherein the respective intensity coefficients correspond to intercepts on a respective distribution centered about the respective arbitrary subpixel location.

19. A processor-implemented method, comprising:
    using a processor of an electronic device, calculating a destination pixel intensity to be displayed on a display of the electronic device, wherein the destination pixel intensity is calculated in accordance with the equation:

$$D_{(x,y)} = 0 + (\alpha_1)(\beta_1)(S_{(x-1,y-1)}) + (\alpha_1)(\beta_3)(S_{(x-1,y+1)}) + (\alpha_2)(\beta_1)(S_{(x,y-1)}) + (\alpha_2)(\beta_2)(S_{(x,y)}) + (\alpha_2)(\beta_3)(S_{(x,y+1)}) + (\alpha_3)(\beta_3)(S_{(x+1,y-1)}) + (\alpha_3)(\beta_2)(S_{(x+1,y)}) + (\alpha_3)(\beta_3)(S_{(x+1,y+1)})$$

where D is the destination pixel intensity, S is a source pixel intensity, $\alpha$ is an intensity coefficient derived with respect to a non-integer X-axis location, and $\beta$ is an intensity coefficient derived with respect to a non-integer Y-axis location.

20. The processor-implemented method of claim 19, wherein the equation is simplified to:

$$D_{(x,y)} = 0 + (\alpha_1)(S_{(x-1,y)}) + (\alpha_2)(S_{(x,y)}) + (\alpha_3)(S_{(x+1,y)})$$ for use in one-dimension.

21. The processor-implemented method of claim 19, wherein the pixel intensities correspond to a grayscale intensity or one or more color channel intensities.

* * * * *